(12) United States Patent
Cho et al.

(10) Patent No.: US 9,173,186 B2
(45) Date of Patent: Oct. 27, 2015

(54) WIRELESS COMMUNICATION SYSTEM AND METHOD FOR ESTABLISHING A CONNECTION BETWEEN USER EQUIPMENT AND A MOBILITY MANAGEMENT ENTITY THEREOF

(75) Inventors: Song Yean Cho, Seoul (KR); Han Na Lim, Seoul (KR); Chae Gwon Lim, Seoul (KR); Sung Ho Choi, Suwon-si (KR); Beom Sik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 163 days.

(21) Appl. No.: 13/702,200

(22) PCT Filed: Jun. 17, 2011

(86) PCT No.: PCT/KR2011/004439
§ 371 (c)(1),
(2), (4) Date: Dec. 5, 2012

(87) PCT Pub. No.: WO2011/159125
PCT Pub. Date: Dec. 22, 2011

(65) Prior Publication Data
US 2013/0079006 A1    Mar. 28, 2013

(30) Foreign Application Priority Data
Jun. 17, 2010   (KR) .......................... 10-2010-0057693

(51) Int. Cl.
*H04W 4/00* (2009.01)
*H04W 60/02* (2009.01)
*H04W 76/02* (2009.01)
*H04W 60/04* (2009.01)
*H04W 8/06* (2009.01)
*H04W 60/00* (2009.01)
*H04W 8/18* (2009.01)

(52) U.S. Cl.
CPC .............. *H04W 60/02* (2013.01); *H04W 4/005* (2013.01); *H04W 8/06* (2013.01); *H04W 60/00* (2013.01); *H04W 60/04* (2013.01); *H04W 76/027* (2013.01); *H04W 8/18* (2013.01)

(58) Field of Classification Search
CPC ..... H04W 60/04; H04W 4/005; H04W 60/02; H04W 76/027
USPC ...................... 455/435.1, 435.2, 414.1, 432.1
See application file for complete search history.

(56) References Cited

U.S. PATENT DOCUMENTS

2007/0213060 A1\* 9/2007 Shaheen ....................... 455/436
2008/0186892 A1\* 8/2008 Damnjanovic ................ 370/311
(Continued)

FOREIGN PATENT DOCUMENTS

KR    10-2009-0016430 A    2/2009

*Primary Examiner* — Khalid Shaheed
(74) *Attorney, Agent, or Firm* — Jefferson IP Law, LLP

(57) ABSTRACT

The present invention relates to a wireless communication system and method for establishing connection between a User Equipment (UE) and a Mobility Management Entity (MME) in the wireless communication system in which the data-centric terminal requests the mobility management entity for attachment and checks, when the mobility management entity responds, data-centric features supported by the mobility management entity. According to the present invention, it is possible to connect the data-centric terminal to the mobility management entity supporting the data-centric features of the corresponding data-centric terminal efficiently in the wireless communication system.

16 Claims, 11 Drawing Sheets

(56) References Cited

U.S. PATENT DOCUMENTS

| | | |
|---|---|---|
| 2009/0217348 A1 | 8/2009 | Salmela |
| 2010/0040024 A1 | 2/2010 | Wu |
| 2010/0057485 A1 | 3/2010 | Luft |
| 2010/0190497 A1* | 7/2010 | Pudney et al. ............ 455/435.1 |
| 2010/0240366 A1* | 9/2010 | Bi et al. .................... 455/435.1 |
| 2010/0279697 A1* | 11/2010 | Yang et al. ................... 455/446 |
| 2010/0297979 A1* | 11/2010 | Watfa et al. ................ 455/404.1 |
| 2011/0170517 A1* | 7/2011 | Bakker et al. ................ 370/331 |
| 2011/0171953 A1* | 7/2011 | Faccin et al. ............... 455/426.1 |
| 2011/0269499 A1* | 11/2011 | Vikberg et al. ............... 455/524 |
| 2012/0039313 A1* | 2/2012 | Jain .............................. 370/338 |

* cited by examiner

WIRELESS COMMUNICATION SYSTEM AND METHOD FOR ESTABLISHING A CONNECTION BETWEEN USER EQUIPMENT AND A MOBILITY MANAGEMENT ENTITY THEREOF

BACKGROUND OF THE INVENTION

1. Field of the Invention

The present invention relates to a wireless communication system and communication method thereof and, in particular, to a wireless communication system and method for establishing connection between a User Equipment (UE) and a Mobility Management Entity (MME) in the wireless communication system.

2. Description of the Related Art

Universal Mobile Telecommunications System (UMTS) is the third generation wireless communication system based on Global System for Mobile communications (GSM) and General Packet Radio Services (GPRS) and uses Wideband Code Division Multiple Access (WCDMA). The $3^{rd}$ Generation Partnership Project (3GPP) as the UMTS standardization organization has proposed Evolved Packet System (EPS) such as Long Term Evolution (LTE). The LTE is a technology for implementing high speed packet-based communication. An LTE system includes a Mobility Management Entity (MME) which manages the mobility of the User Equipment (UE) connected thereto.

DISCLOSURE OF INVENTION

Technical Problem

However, as the services provided through the wireless communication system are diversified, the UE is also being equipped various supplementary functions. The MME is embodied to support the supplementary functions of the UE. Accordingly, in order to receive the communication service in association with a certain supplementary function, the UE has to connect to the MME supporting the corresponding supplementary function.

There is therefore a need of a method for connecting the UE to an MME supporting the intended supplementary function efficiently.

Solution to Problem

In accordance with an aspect of the present invention, a method for connecting a data-centric terminal to a mobility management entity in a wireless communication system includes requesting, at the data-centric terminal, the mobility management entity for attachment; and checking, when the mobility management entity responds, data-centric features supported by the mobility management entity.

Preferably, the method further includes determining, when the mobility management entity accepts the attachment, whether the data-centric terminal is to maintain the attachment to the mobility management entity according to the data-centric features; and performing, when the data-centric terminal determines to maintain the attachment, data-centric communication with the mobility management entity using the data-centric feature and, when not maintain the attachment, releasing the attachment to the mobility management entity.

In accordance with another aspect of the present invention, a wireless communication system includes a data-centric terminal for performing data-centric communication using a unique data-centric feature; and a mobility management entity for managing mobility of the data-centric terminal, wherein the mobility management entity notifies, when the data-centric terminal requests for attachment, the data-centric terminal of data-centric features supported by the mobility management entity.

Preferably, the data-centric terminal determines, when the mobility management entity accepts the attachment, whether to maintain the attachment to the mobility management entity according to the data-centric feature and performs, when the data-centric terminals determines to maintain the attachment, data-centric communication with the mobility management entity using the data-centric feature and, otherwise, releases the attachment to the mobility management entity.

Advantageous Effects

In order to solve the above problems, the wireless communication system and method for establishing a connection between a UE and an MME in the system is capable of connecting the UE to the MME supporting the corresponding supplementary function efficiently. That is, the present invention is capable of connecting a data-centric terminal to a mobility management entity supporting data-centric features efficiently. Accordingly, it is possible for the mobility management entity supporting the data-centric feature to support the data-centric communication more efficiently and the data-centric terminal is capable of performing the data-centric communication more efficiently in the wireless communication system.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

Figure 1:
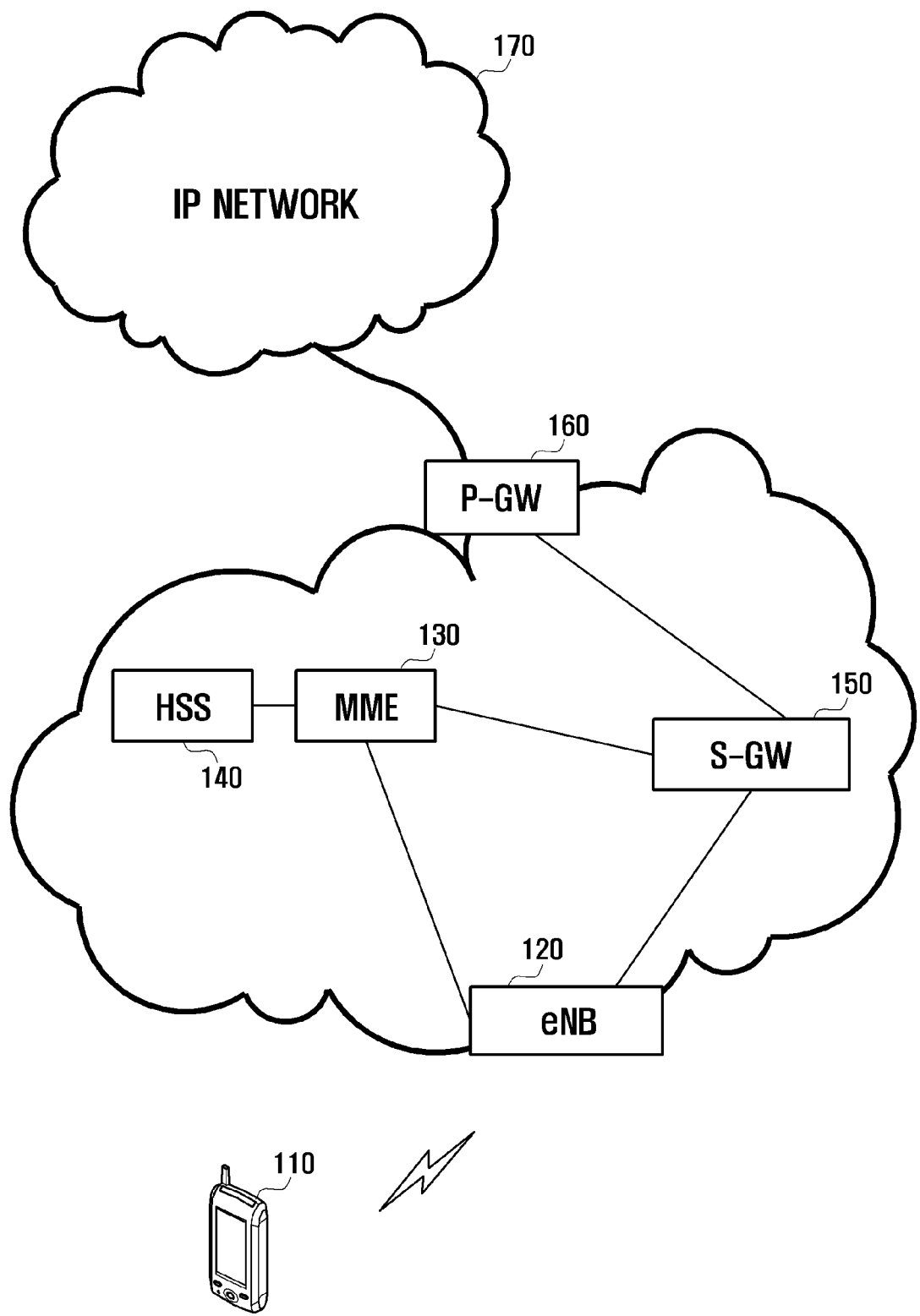
FIG. 1 is a diagram illustrating the architecture of a wireless communication system according to the first embodiment of the present invention.

FIG. 1 is a diagram illustrating the architecture of a wireless communication system according to the first embodiment of the present invention.

Referring to FIG. 1, the wireless communication system of this embodiment includes an enhanced Node B (eNB) 120, an MME 130, a Home Subscriber Server (HSS), a Serving Gateway (S-GW) 150, and a Packet Data Network Gateway (P-GW) 160.

The UE 110 may be fixed or mobile. Also, the UE 110 may be a normal UE capable of normal communication functions or a data-centric UE capable of specific supplementary function, e.g. data centric communication function. Although the description is directed to the data-centric UE capable of Machine Type Communication (MTC) function, the present invention is not limited thereto. Here, the MTC technology is applicable to Smart Metering for automated communication between a power company server and a home meter and an Alarm System for automated communication between a security company server and an illegal home invasion alarm.

The eNB 120 controls a cell. The eNB 120 is a macro cell which is the cell of a normal cellular system. Here, the terms 'eNB' and 'cell' can be used interchangeably. The eNB 120 establishes a connection with the UE 110 through a radio channel and controls radio resource. For example, the eNB 120 generates and broadcasts system information within the cell and allocates to the UE 110 the radio resources for communicating packet data or control information with the UE. 110. The system information may include Public Land Mobile Network Identifier (PLMN ID) for access to the PLMN via the eNB 120, eNB Cell Global ID (ECGI), and a Tracking Area ID (TAI) of the tracking area including the cell. The eNB 120 makes a handover decision and commands handover based on the channel measurement result of the current cell and neighbor cells that is fed back by UE 110. In order to accomplish this, the eNB 120 is provided with a control protocol such as Radio Resource Control Protocol related to radio resource management.

The MME 130 manages the UE 110 in idle mode and selects the S-GW 150 and P-GW 160 for the UE 110. The MME is also responsible for roaming and authentication-related functions. The MME 130 is also processing the bearer signal generated by the UE 110. For this purpose, the MME 130 allocates identity information to the UE 110 and manages the UE 110 attached with the identity information. Here, the MME 130 can be a normal MME for supporting the normal UEs or the data-centric MME for supporting the data-centric UE. Although the description is directed to the MTC MME for supporting the MTC UE, the present invention is not limited thereto.

The MME is connected to the eNB 120 through a radio channel and to the UE 110 via the eNB 120. The MME 130 is connected to the eNB 120 through an S1-MME interface. At this time, the MME 130 communicates with the UE 110 using Non Access Stratum (NAS) messages. The MME 130 supports a plurality of tracking areas to connect to a plurality of eNBs 120 using the corresponding tracking area information. That is, the eNBs using the same tracking area information can connect to the same MME 130. The eNBs using different tracking area informations can connect to different MMEs 130. The eNBs using the different tracking area informations may connect to the same MME 130.

In order to support the data-centric communication efficiently in the wireless communication system, various data-centric proprieties should be defined. For example, the MTC feature for supporting the MTC technology efficiently in the wireless communication system may be Low Mobility, Time Controlled, Time Tolerant, Packet Switched Only (PS Only), Small Data Transmissions, Mobile Originated Only, Infrequent Mobile Terminated, Secure Connection, Location Specific Trigger, Network Provided Destination for Uplink Data, Infrequent Transmission, or Group Based MTC.

For the MTC UE and MTC MME, some of the MTC features are mandatory and others are optional. For example, in the smart metering for the MTC UE to report utilization amount measured for a predetermined duration periodically, the MTC UE transmits the data less than a few hundred bytes, the 'Small Data Transmissions' feature is mandatory. In this case, the 'Location Specific Trigger' feature for the MTC UE to initiate MTC at a specific position may not be mandatory between the MTC UE and the MTC MME. In order to perform MTC efficiently, the MTC UE has to attach the MTC MME supporting the required MTC features.

In the following description, the term 'essential MTC feature' denotes the MTC feature required mandatorily for the MTC UE to perform MTC. That is, if an essential MTC feature is supported by a radio network, the MTC UE is capable of performing MTC via the MTC MME of the radio network. The term 'optional MTC feature' denotes the MTC feature which is not required mandatorily for the MTC UE to perform MTC. The optional MTC feature may be required for MTC optimization in the radio network. That is, although the radio network does not support the optional MTC features, the MTC UE is capable of MTC via the MTC MME of the radio network.

In the following description, the term 'supported MTC feature' denotes the MTC feature supported by the MTC MME of the wireless communication in order for the MTC UE to perform MTC. At this time, the supported MTC feature can be configured so as to be included in the essential MTC features of the MTC UE or not. The supported MTC feature also can be configured so as to be included in the optional MTC features of the MTC UE or not.

That is, if the supported MTC feature is included in the essential features, the MTC MME is capable of supporting the MTC UE. The MTC UE is capable of performing MTC vial the MTC MME using the essential MTC feature. At this time, if the supported MTC feature includes an optional MTC feature, the MTC UE is also capable of using the optional MTC feature in performing MTC. If the supported MTC feature does not include any essential MTC feature, the MTC MME cannot support the MTC of the MTC UE. That is, the MTC UE cannot perform MTC via the MTC MME. Here, although the supported MTC feature includes an optional MTC feature, the MTC UE cannot perform MTC via the MTC MME. According, in order for the MTC UE to perform MTC via the MTC MME, the MTC UE should attach the MTC MME supporting the essential MTC feature.

The HSS 150 stores the subscription data of the UE 110. If the UE attaches to the MME 130, the HSS 140 updates the subscription information of the UE 110. The HSS 140 provides the MME 130 with the subscription information of the UE 110 in order for the MME 130 to control the UE 110 with the subscription information. The subscription information may include the MTC subscription information for an MTC UE. Here, the MTC subscription information may include the essential and optional MTC features of the corresponding MTC UE.

The S-GW 150 connects to the eNB 120 and the MME 130 through radio channels. The S-GW 150 connects to the eNB through an S1-U interface. The S-GW 150 is responsible for the mobility control function of the UE 110. When the UE performs handover between the eNBs 120 or between 3GPP radio networks, the S-GW 150 works as a mobility anchor of the UE 110.

The P-GW 160 is connected to the S-GW 150 through a radio channel. Here, the P-GW 160 is connected to the S-GW through a S5 interface. The P-GW 160 connects to the Internet Protocol (IP) network 170. The P-GW 160 is responsible for the IP address allocation function and packet data-related function. That is, the P-GW 160 delivers the packet data from the IP network 170 to the UE 110 via the S-GW 150 and eNB 120. When the UE 110 roams between the 3GPP radio network and non-3GPP radio network, the P-GW 160 works as the mobility anchor of the UE 110. The P-GW 160 also determines the bearer band for the UE 110 and performs packet data forwarding and routing function.

If it connects to the eNB 120 of the wireless communication system, the UE 110 is capable of being connected to the IP network 170 through the data path via the eNB 120, S-GW 170, and P-GW 160 so as to communicate packet data. The UE 110 is capable of transmitting a NAS request message to the MME 130 via the eNB 120. At this time, the NAS request message may include at least one of an attach request, tracking area update request, or service request. Upon receipt of the NAS request message, the eNB selects the MME 130 according to a Network Node Selection Function (NNSF) to deliver the NAS request message to deliver the NAS request message. This is because the eNB 120 may be connected to plural MMEs 130 through separate S1-MME interfaces.

Although the description is directed to the case where the UE 110 is an MTC UE and the eNB 120 is connected to a normal MME and an MTC MME through separate S1-MME interfaces in this embodiment, the present invention is not limited thereto. That is, although the MTC UE is replaced with another UE implemented to perform a specific supplementary function and differentiated from the normal UE and the MTC MME with another MME supporting the another UE, the present invention can be applied. In this embodiment, the description is made under the assumption that the MTC MME determines whether to accept attachment of the MTC UE according to whether the MTC MME support the essential MTC feature of the MTC UE. That is, the description is made under the assumption that all other conditions for determining whether to accept attachment of the MTC UE in the normal MME or the MME are fulfilled.

Figure 2:
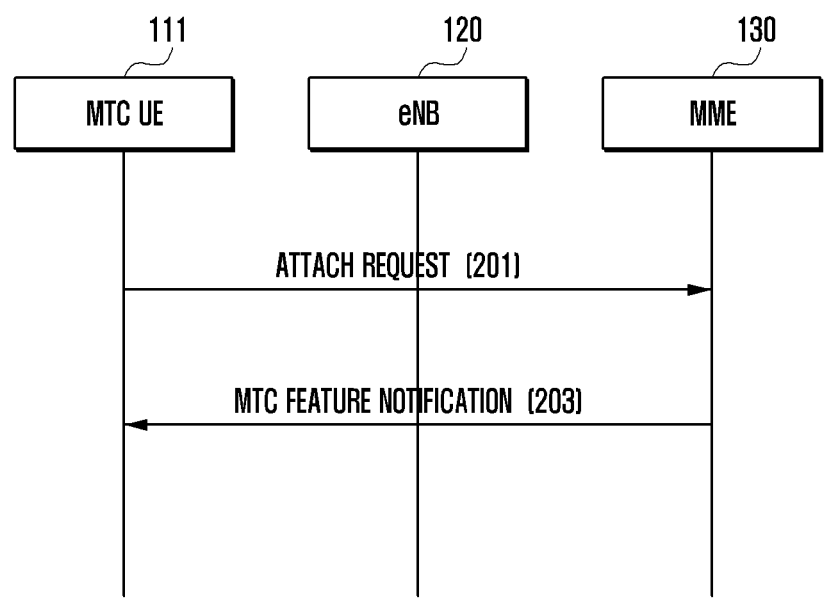
FIG. 2 is a signal flow diagram illustrating the communication procedure in the wireless communication system according to the first embodiment of the present invention.

FIG. 2 is a signal flow diagram illustrating the communication procedure in the wireless communication system according to the first embodiment of the present invention.

Referring to FIG. 2, in the communication procedure of the wireless communication system of this embodiment, the MTC UE 111 first requests the MME 130 for attach via the eNB 120 at step 201. At this time, the MTC UE 111 retains the essential and optional MTC features. That is, the MTC UE 111 selects one of the radio networks accessible through the eNB 120 and requests for the attachment to the MME 130 of the corresponding radio network. Here, the MTC UE 111 is capable of storing the information on the access PLMNs. At this time, the MTC UE 111 is capable of requesting for the attachment to the MTC MME 131 or the normal MME (as denoted by reference number 133 of FIG. 3). The MTC UE 1110 is capable of transmitting International Mobile Subscriber Identity (IMSI) to the MME 130.

Next, if the MTC UE 111 requests for attachment, the MME 130 notifies the MTC UE 111 of the MTC features via the eNB 120. At this time, the MME 130 retains the supported MTC feature supportable by the corresponding radio network. The MME 130 notifies the MTC UE 111 of the supported MTC feature. Here, the MME 130 expresses the supported MTC features in a bitmap for notifying of the MTC features and transmits the bitmap to the MTC UE 111. With the bitmap, the MTC UE 111 is capable of checking whether the MME 130 supports MTC. The MTC UE is also capable for checking whether the MME 130 supports the essential MTC feature or optional MTC feature. That is, the MTC UE 111 is capable of identifying the MTC features supported by the MME 130 or not.

Figure 3:
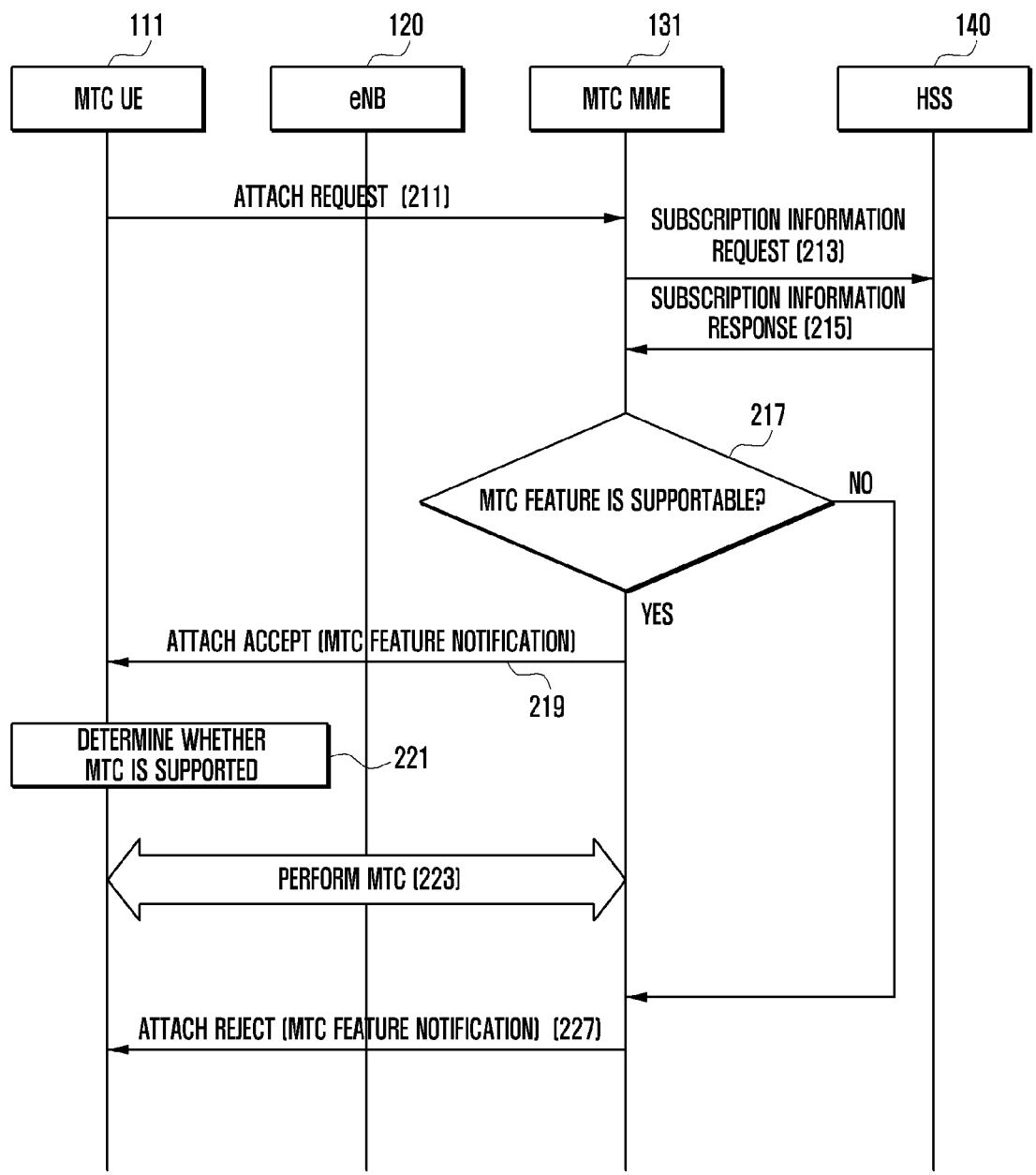
FIG. 3 is a signal flow diagram illustrating a connection procedure of the wireless communication system according to the first embodiment of the present invention.

FIG. 3 is a signal flow diagram illustrating a connection procedure of the wireless communication system according to the first embodiment of the present invention.

Referring to FIG. 3, in the connection procedure of the wireless communication system according to this embodiment, the MTC UE 111 requests the MME 130 for attachment via the eNB 120 at step 211. At this time, the MTC UE 111 is retaining the essential and optional MTC features. That is, the MTC UE 111 selects one of the radio networks accessible with the eNB 120 and requests for attachment to the MME 130 of the corresponding radio network. Here, the MTC UE 111 is capable of retaining the information on the PLMNs accessible through the eNB 120. At this time, the MTC UE 111 is capable of attachment to the MTC MME 131 or the normal MME (denoted by reference number 133 of FIG. 3). The MTC UE 111 is capable of transmitting the unique subscription identity information to the MME 130.

Next, if the MTC UE 111 requests for attachment, the MTC MME 131 requests the HSS 140 for the subscription information of the MTC UE 111 at step 213. At this time, the MTC MME 131 reports the location of the MTC UE 111 to the HSS 140 to request for the subscription information of the MTC UE 111. Here, the MTC MME 131 sends the subscription identity information of the MTC UE 111. Afterward, if the subscription information of the MTC UE 111 is requested, the HSS 140 responds by sending the subscription information of the MTC UE 111 to the MTC MME 131. At this time, the HSS 140 updates the location of the MTC UE 111 and notifies the MTC MME 131 of the update to transmit the subscription information of the MTC UE 111. That is, the HSS 140 retrieves the subscription information of the MTC UE 111 using the subscription identity information and transmits the found subscription information to the MTC MME 131. At this time, the subscription information includes the MTC subscription information of the MTC UE 111. The MTC subscription information includes the essential and optional MTC features of the MTC UE 111.

If the subscription information of the MTC UE 111 is received, the MTC MME 131 analyzes the subscription information to determine whether it is possible to support the essential MTC feature of the MTC UE 111 at step 217. At this time, the MTC MME 131 is retaining the MTC features supportable by the corresponding radio network. That is, the MTC MME 131 checks the essential MTC feature in the subscription information of the MTC UE 111 to determine whether the essential MTC feature is included in the supported MTC features. Here, if the supported MTC features include the essential MTC feature of the MTC UE 111, the MTC MME 131 determines that the essential MTC feature of the MTC UE 111 is supportable. Otherwise, if the supported MTC features do not include the essential MTC feature of the MTC UE, the MTC MME 131 determines that the essential MTC feature of the MTC UE 111 is not supportable.

If it is determined that the essential MTC feature of the MTC UE 111 is supportable, the MTC MME 131 accepts the registration of the MTC UE 111 at step 219. At this time, the MTC MME 131 notifies the MTC UE 111 of the supported MTC features. Here, the MTC MME 131 expresses the supported MTC features in a bitmap for notifying of the MTC features and transmits the bitmap to the MTC UE 111.

The attachment to the MME 130 is accepted, the MTC UE 111 determines whether the MME 130 supports MTC at step 221. That is, the MTC UE 111 determines whether the MME 130 is the MTC MME 131. The MTC UE 111 determines whether the MME 130 is the MTC MME 131 based on whether the MME 130 has transmitted the MTC features. If it is determined that the MTC features has been transmitted by the MME 130, the MTC UE 111 determines that the MME 130 is the MTC MME 131. Otherwise, if it is determined that the MTC features has not been transmitted by the MME 130, the MTC UE 1111 determines that the MME 130 is the normal MME 133. Afterward, the MTC UE 111 performs MTC through the MTC MME 131 at step 223. At this time, the MTC UE 111 is capable of performing MTC using the essential MTC feature. The MTC UE 111 is also capable of performing MTC using the supported MTC features of the MTC MME 131. That is, the MTC UE 111 is capable of checking the MTC feature selected among the supported MTC features for use in performing MTC.

If it is determined that the essential MTC feature of the MTC UE 111 is not supportable at step 217, the MTC MME 131 rejects the registration of the MTC UE 111 at step 227. At this time, the MTC MME 131 notifies the MTC UE 111 of the supported MTC features. Here, the MTC MME 131 expresses the supported MTC features in a bitmap for notifying of the MTC features and transmits the bitmap to the MTC UE 111. In this way, the MTC UE 111 is capable of checks the MTC features not supported by the MTC MME 131. The MME 131 is also capable of notifying the MTC UE 111 of the cause of the registration rejection. That is, the MTC MME 131 is capable of notifying the MTC UE 111 that the essential MTC feature is not supported. The MTC MME 131 is also capable of notifying the MTC UE 111 of a retrial period for attachment. The MTC MME 131 is also capable of notifying the MTC UE 111 of the information on PLMNs for retrial of registration.

Figure 4:
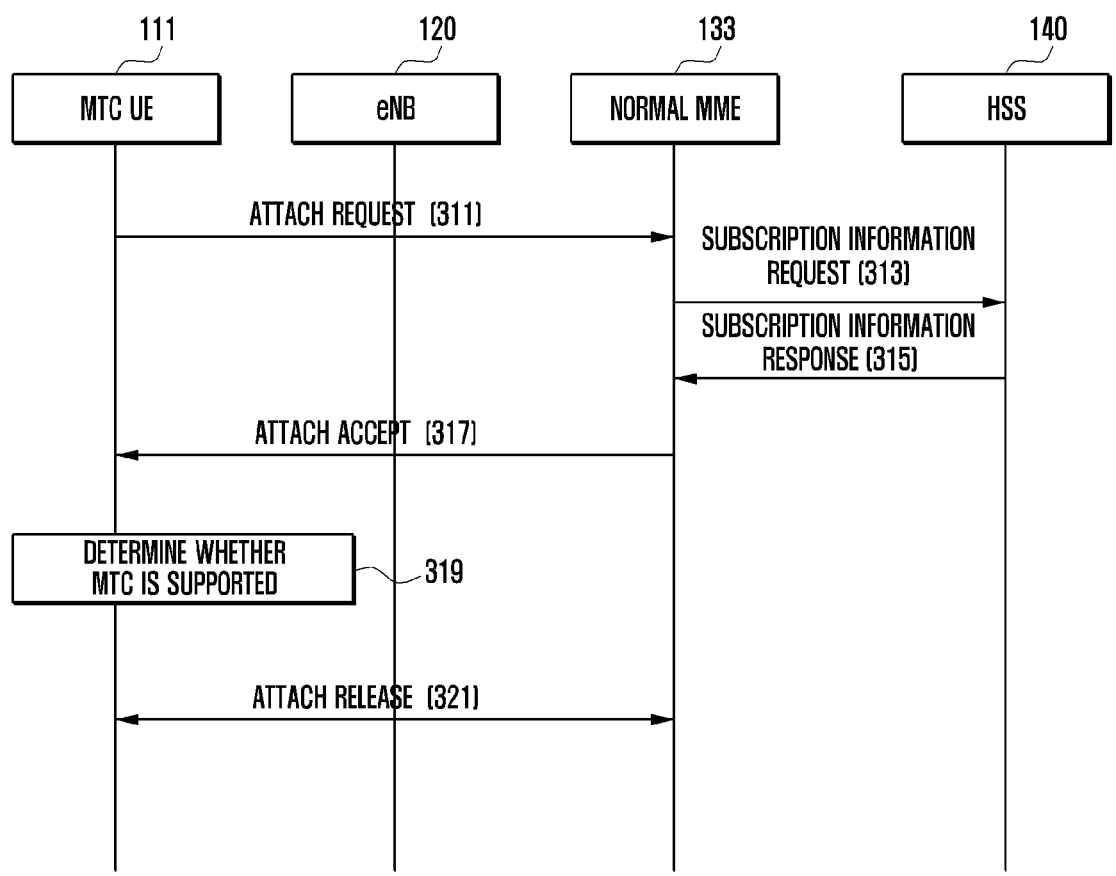
FIG. 4 is a signal flow diagram illustrating the connection procedure of the wireless communication system according to the first embodiment of the present invention.

FIG. 4 is a signal flow diagram illustrating the connection procedure of the wireless communication system according to the first embodiment of the present invention.

Referring to FIG. 4, in the connection procedure of the wireless communication system of this embodiment, the MTC UE 111 first requests the MME 130 for attachment via the eNB 120 at step 311. At this time, the MTC UE 111 is retaining the essential and optional MTC features. That is, the MTC UE 111 selects one of the radio networks accessible through the eNB 120 to requests the MME 130 of the corresponding radio network for attachment. Here, the MTC UE 111 is capable of retaining the information on the PLMNs accessible through the eNB 120. At this time, the MTC UE 111 is capable of requesting the MTC MME 131 or the normal MME 133 for attachment. The MTC UE 111 is capable of transmitting the unique subscription identity information to the MME 130.

Upon receipt of the registration request from the MTC UE 111, the normal MME 133 requests the HSS 140 for the subscription information of the MTC UE 111 at step 313. At this time, the normal MME 133 is capable of reporting the location of the MTC UE 111 to request for the subscription information of the MTC UE 111. Here, the normal MME 133 delivers the subscription identity information of the MTC UE 111 to the HSS 140. Afterward, if the subscription information of the MTC UE 111 is requested, the HSS 140 responds with by transmitting the subscription information of the MTC 111 to the normal MME 133. At this time, the HSS 140 updates the location of the MTC UE 111 and notifies the normal MME 133 of the update to transmit the subscription information of the MTC UE 111. That is, the HSS 140 retrieves the subscription information of the MTC UE 111 using the subscription identity information and transmits the found subscription information to the normal MME 133. At this time, the subscription information includes the MTC subscription information for the MTC UE 111. Here, the MTC subscription information includes the essential and optional MTC features of the corresponding MTC UE 111.

If the subscription information of the MTC UE 111 is received, the normal MME 133 accepts the registration of the MTC UE 111 at step 317. At this time, the normal MME 133 is not capable of processing the MTC subscription information in the subscription information of the MTC UE 111. That is, the normal MME 133 cannot discriminate between the MTC UE 111 and normal UE (not shown). As a consequence, the normal MME 133 regards the MTC UE 111 as a normal UE so as to accept the registration of the MTC UE 111.

If the registration is accepted by the MME 130, the MTC UE 111 determines whether the MME 130 supports MTC at step 319. That is, the MTC UE 111 determines whether the MME 130 is the MTC MME 131. At this, the MTC UE 111 is capable of determining whether the MME 130 is the MTC MME 131 according to whether the MME 130 has notified of the MTC features. If the MTC features have been notified, the MTC UE 111 determines whether the MME 130 is the MTC MME 131. Otherwise, if no MTC feature has been notified, the MTC UE 111 determines that the MME 130 is the normal MME 133. The MTC UE 111 also detaches from the normal MME 133 at step 321. That is, since the normal 133 cannot support the essential MTC feature, the MTC UE 111 detaches from the normal MME 133.

Although, in this embodiment, the description is directed to the exemplary case where the MTC UE 111 determines whether the MME 130 has reported the MTC features to determine whether the MME 130 is the MTC MME 131, the present invention is not limited thereto. That is, the present invention can be implemented in such a way that the MTC UE 111 discriminates between the MTC and normal MMEs 131 and 133 based on the MTC features transmitted by both the MTC and nor MME 131 and 133. That is, the MTC MME 131 is retaining the supported MTC features and the normal MME 133 is not retaining the supported MTC features. If the MTC UE 111 requests for attachment, the MTC MME 131 expresses the supported MTC features in a bitmap for notifying of the MTC features and transmits the bitmap to the MTC UE 111. Meanwhile, if the MTC UE 111 request for attachment, the normal MME 133 expresses the supported MTC features in a bitmap for notifying of the MTC features and transmits the bitmap to the MTC UE 111. Here, the normal MME 133 transmits the bitmap indicating that there is no supported MTC feature.

In order to accomplish this, the MTC UE 111 is capable of determining whether the MME 130 supports MTC. Also, the MTC UE 111 is capable of determining whether the MME 130 supports the essential MTC feature or optional MTC feature. That is, the MTC UE 111 is capable of discriminating between the MTC features supported by the MME 130 and the MTC features not supported by the MME 130.

Figure 5:
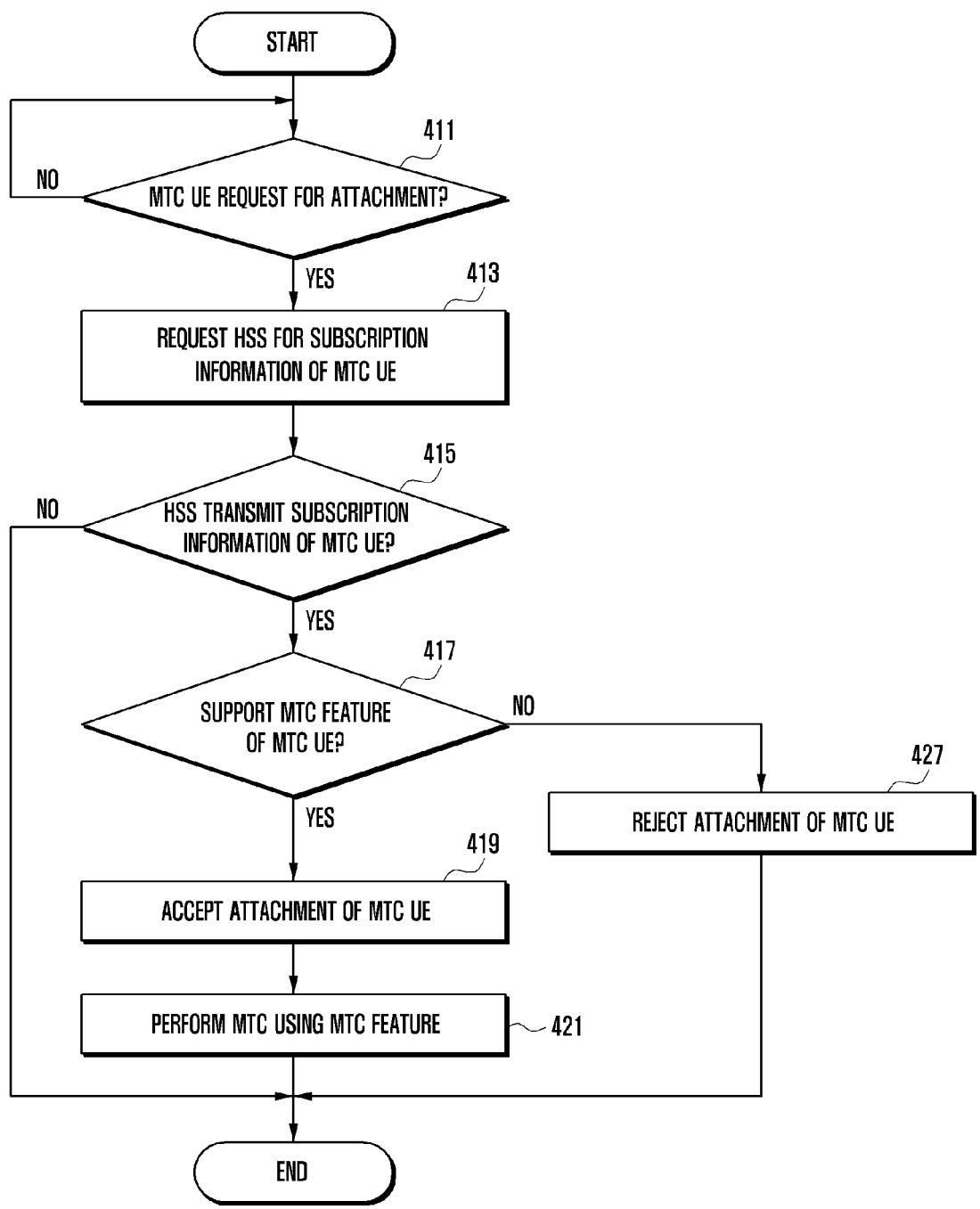
FIG. 5 is a flowchart illustrating the MME procedure in FIG. 3.

FIG. 5 is a flowchart illustrating the MME procedure in FIG. 3. Here, the description is made under the assumption that the MME is an MTC MME.

Referring to FIG. 5, in the procedure according to this embodiment, the MTC MME 131 first detects the attach request of the MTC UE 111 at step 411. At this time, the MTC MME 131 checks the subscription identity information of the MTC UE 111. The MTC MME 131 requests the HSS 140 for the subscription information of the MTC UE 111 at step 413. At this time, the MTC MME 131 reports the location of the MTC UE 111 to the HSS 140 to request for the subscription information of the MTC UE 111. Here, the MTC MME 131 sends the subscription identity information of the MTC UE 111 to the HSS 140.

Subsequently, if the subscription information of the MTC UE 111 is received from the HSS 140, the MTC MME 131 detects this at step 415 and analyzes the subscription information to determine whether it can support the essential MTC feature at step 417. At this time, the MTC MME 131 is retaining the supported MTC features supportable in the corresponding radio network. That is, the MTC MME 131 checks the essential MTC feature in the subscription information of the MTC UE 111 to determine whether the essential MTC feature is included in the supported MTC feature. If the essential MTC feature of the MTC UE 111 is included in the supported MTC features, the MTC MME 131 determines that it is possible to support the essential MTC feature of the MTC UE 111. Otherwise, if the essential MTC feature of the MTC UE 131 is not included in the supported MTC features, the MTC MME 131 determines that it is impossible to support the essential MTC feature of the MTC UE 111.

Finally, if it is determined that it can support the essential MTC feature of the MTC UE 111, the MTC MME 131 accepts the attachment of the MTC UE 111 at step 419. At this time, the MTC MME 131 notifies the MTC UE 111 of the supported MTC features. Here, the MTC MME 131 expresses the supported MTC features in a bitmap for notifying of the MTC features and transmits the bitmap to the MTC UE 111. The MTC MME 131 performs MTC with the MTC UE 111 at step 421. At this time, the MTC MME 131 is capable of performing the MTC with the essential MTC feature for the MTC UE 111. The MTC MME 131 is also capable of performing the MTC with the supported MTC features for the MTC UE 111. That is, in order to optimize the MTC, the MTC MME 131 is capable of checking MTC feature selected for the MTC UE 111 among the supported MTC features.

If it is determine that it cannot support the essential MTC feature of the MTC UE 111 at step 417, the MTC MME 131 rejects the attachment of the MTC UE 111 at step 427. At this time, the MTC MME 131 notifies the MTC UE 111 of the supported MTC features. The MTC MME expresses the supported MTC features in a bitmap for notifying of the MTC features and transmits the bitmap to the MTC UE 111. In this way, the MTC UE 111 is capable of checking the MTC feature not supported by the MTC MME 131. The MTC MME 131 is also capable of notifying of the reason of the attachment rejection. That is, the MTC MME 131 is capable of notifying the MTC UE 111 that it does not support the essential MTC function. The MTC MME 131 is also capable of notifying the MTC UE 111 of the retrial period for attachment. The MTC MME 131 is also capable of notifying of the information on different PLMNs for use in retrial of attachment.

Figure 6:
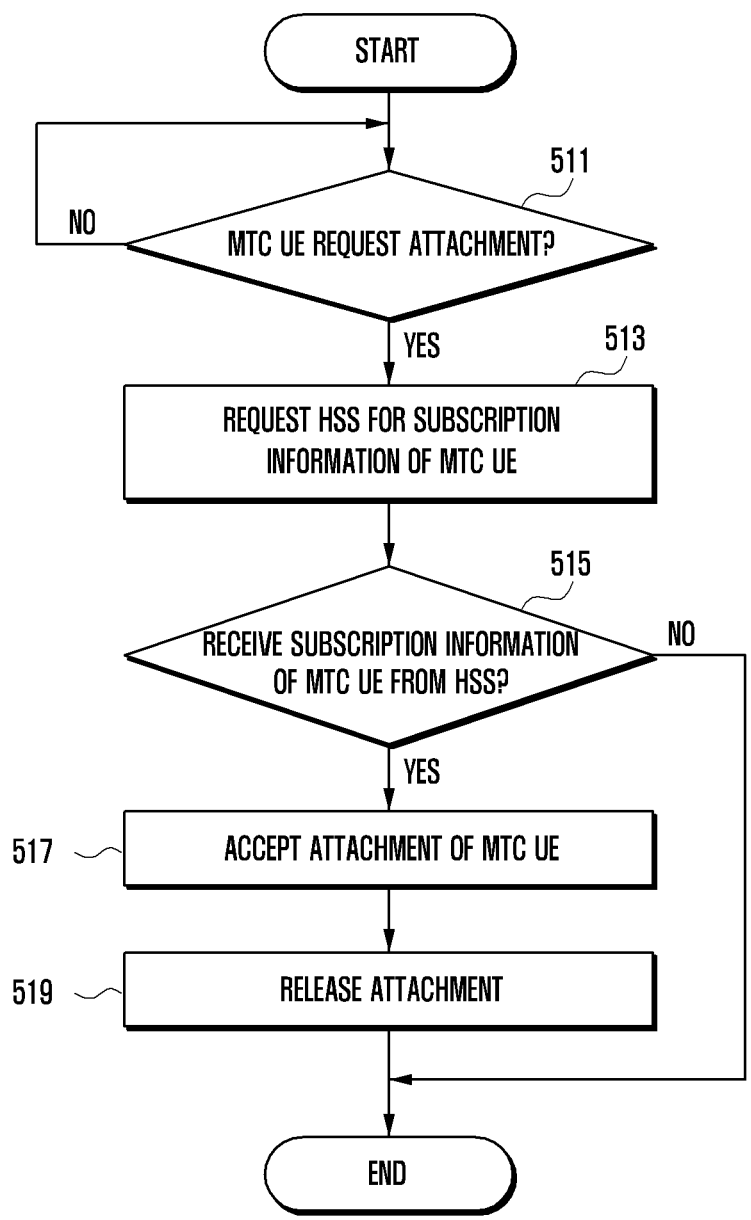
FIG. 6 is a flowchart illustrating the MME procedure in FIG. 4.

FIG. 6 is a flowchart illustrating the MME procedure in FIG. 4. Here, the description is made under the assumption that the MME is a normal MME.

Referring to FIG. 6, in the MME procedure of the embodiment, the normal MME 133 firsts detects the attach request of the MTC UE 111 at step 511. At this time, the normal MME 133 checks the subscription identity information of the MTC UE 111. The normal MME 133 requests the HSS 140 for the subscription information of the MTC UE 111 at step 513. At this time, the normal MME 133 reports the location of the MTC UE 111 to the HSS 140 to request for the subscription information of the MTC UE 111. Here, the normal MME 131 transmits the subscription identity information of the MTC UE 111 to the HSS 140.

Finally, if the subscription information of the MTC UE 111 is received from the HSS 140, the normal MME 133 detects this at step 515 and accepts the attachment of the MTC UE 111 at step 517. At this time, the normal MME 133 does not process the MTC subscription information in the subscription information of the MTC UE 111. That is, the normal MME 133 does not discriminate between the MTC UE 111 and the normal UEs. As a consequence, the normal MME 133 regards the MTC UE 111 as a normal UE so as to accept attachment of the MTC UE 111. Here, the normal MME 133 expresses the supported MTC features in a bitmap for notifying of the MTC features and transmits the bitmap to the MTC UE 111. That is, the normal MME 133 is capable of transmitting the bitmap configured to indicate that there is not supported MTC feature. Afterward, the normal MME 133 releases the attachment of the MTC UE 111 at step 519. At this time, the normal MME 133 releases the attachment according to the request from the MTC UE 111. That is, since it cannot support the essential MTC feature, the normal MME 133 releases the attachment of the MTC UE 111.

Figure 7:
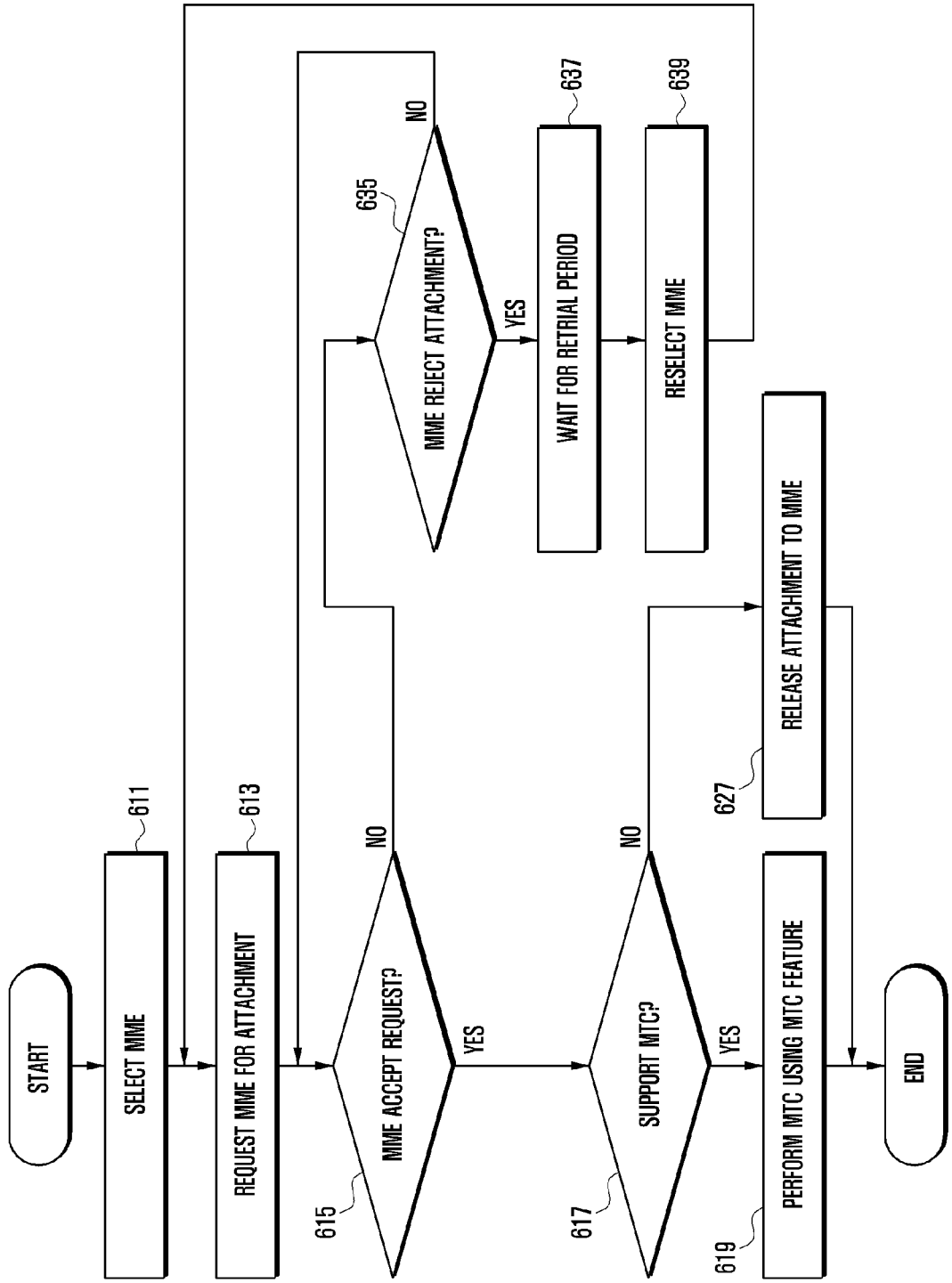
FIG. 7 is a flowchart illustrating the UE procedure in FIGS. 3 and 4.

FIG. 7 is a flowchart illustrating the UE procedure in FIGS. 3 and 4. Here, the description is made under the assumption that the UE is an MTC UE.

Referring to FIG. 7, in the UE procedure of this embodiment, the MTC UE 111 first selects the MME 130 at step 611. That is, the MTC UE 111 selects one of the radio networks accessible through the eNB 120. At this time, the MTC UE 111 is capable of retaining the information on the operators of the radio networks accessible through the eNB 120. The MTC UE 111 is retaining the essential MTC feature and selected MTC feature. Afterward, the MTC UE 111 requests the MME 130 for attachment at step 613. At this time, the MTC UE 111 is capable of requesting the MTC MME 131 or the normal MME 133 for the attachment. The MTC UE 111 is also capable of transmitting the unique subscription identity information to the MME 130.

Subsequently, if the MME 130 accepts the attachment, the MTC UE 111 detects this at step 615 and determines whether the MME 130 supports MTC at step 617. At this time, the MTC UE 111 is capable of determining whether the MME 130 is an MTC MME 131 according to whether the MTC features have been reported by the MME 130. If the MTC features have been reported by the MME 130, the MTC UE 111 determines that the MME 130 is the MTC MME 131. If the MTC features have not been reported, the MTC UE 111 determines that the MME 130 is the normal MME 133. Meanwhile, if the bitmap indicating the MTC features is received from the MME 130, the MTC UE 111 is capable of checking the supported MTC features of the MME 130. The MTC UE 111 is also capable of determining whether the MME 130 supports the MTC for the MTC UE 111 according to the supported MTC features of the MME 130.

Finally, if it is determined that the MME 130 supports MTC at step 617, the MTC UE 111 performs MTC through the MME 130, i.e. the MTC MME 131. At this time, the MTC MME 111 is capable of performing MTC using the essential MTC feature. The MTC UE 111 is also capable of performing MTC using the supported MTC features of the MTC MME 131. That is, the MTC UE 111 is capable of checking the MTC feature selected among the supported MTC features of the MTC MME 131 for use in performing MTC.

Otherwise, if it is determined that the MME 130 does not support MTC at step 617, the MTC UE 111 detaches from the MME 130 at step 627. That is, since the normal MME 133 cannot support the essential MTC feature, the MTC UE 111 releases the attachment to normal MME 133. At this time, the MTC UE 111 is capable of storing the operator information of the radio network corresponding to the normal MME 133 to reference in selecting the MME 130 afterward. That is, the MTC UE 111 is capable of storing the operator information of the corresponding radio network as forbidden PLMN ID to avoid attachment to the corresponding normal MME 133 afterward.

Meanwhile, if the attachment to the MME 130 is rejected at step 615, the MTC UE 111 detects this at step 635 and waits for the attachment retrial period at step 637. At this time, the MTC UE 111 is capable of receiving the bitmap informing of the MTC features from the MME 130 and checks the MTC features that are not supported by the MME 130. The MTC UE 111 is capable of waiting for a predetermined attachment retrial period. The MTC UE 111 is also capable of waiting for the attachment retrial period as notified by the MME 130. Afterward, the MTC UE 111 reselects the MME 130 at step 639 and returns the procedure to step 615. The MTC UE 111 performs at least a part of steps 615 to 639 again.

At this time, the MTC UE 111 is capable of retaining the operator information of the radio networks, which the eNB 120 is accessible, for use in selecting another MME 130. The MTC UE 111 is also capable of using the operation information of the different radio networks that are reported by the MTC MME 131 for selecting another MME 130. For example, if the operation informations of the individual radio networks are stored, the MTC UE 111 selects another MME using the information and, otherwise, selects another MME 130 as notified by the MTC MME 131. Here, the MTC UE 111 is capable of selecting another MME 130 by referencing previously stored access-forbidden information. That is, the MTC UE is capable of another MME 130 after ruling out the selection-forbidden information in the operator informations of other radio networks that are stored previously or notified by the MTC MME 131.

According to this embodiment, it is possible to connect the UE 110 to the MME 130 supporting the intended supplementary function efficiently in the wireless communication system. That is, it is possible to connect the MTC UE 111 to the MTC MME 131 supporting the essential MTC feature. Accordingly, the MTC MME 131 is capable of supporting MTC more efficiently, and the MTC UE 111 is capable of performing MTC more efficiently in the wireless communication system.

Although the above-description is directed to the exemplary case for determining whether to accept the attachment of the MTC UE according to whether the MTC MME supports the essential MTC feature, the present invention is not limited thereto. That is, the present invention can be implemented in such a way that the MTC UE determines whether the MTC MME supports the essential MTC feature. At this time, criterion for determining whether to maintain the attachment of the MTC UE to the MTC MME can be configured by an external server.

Figure 8:
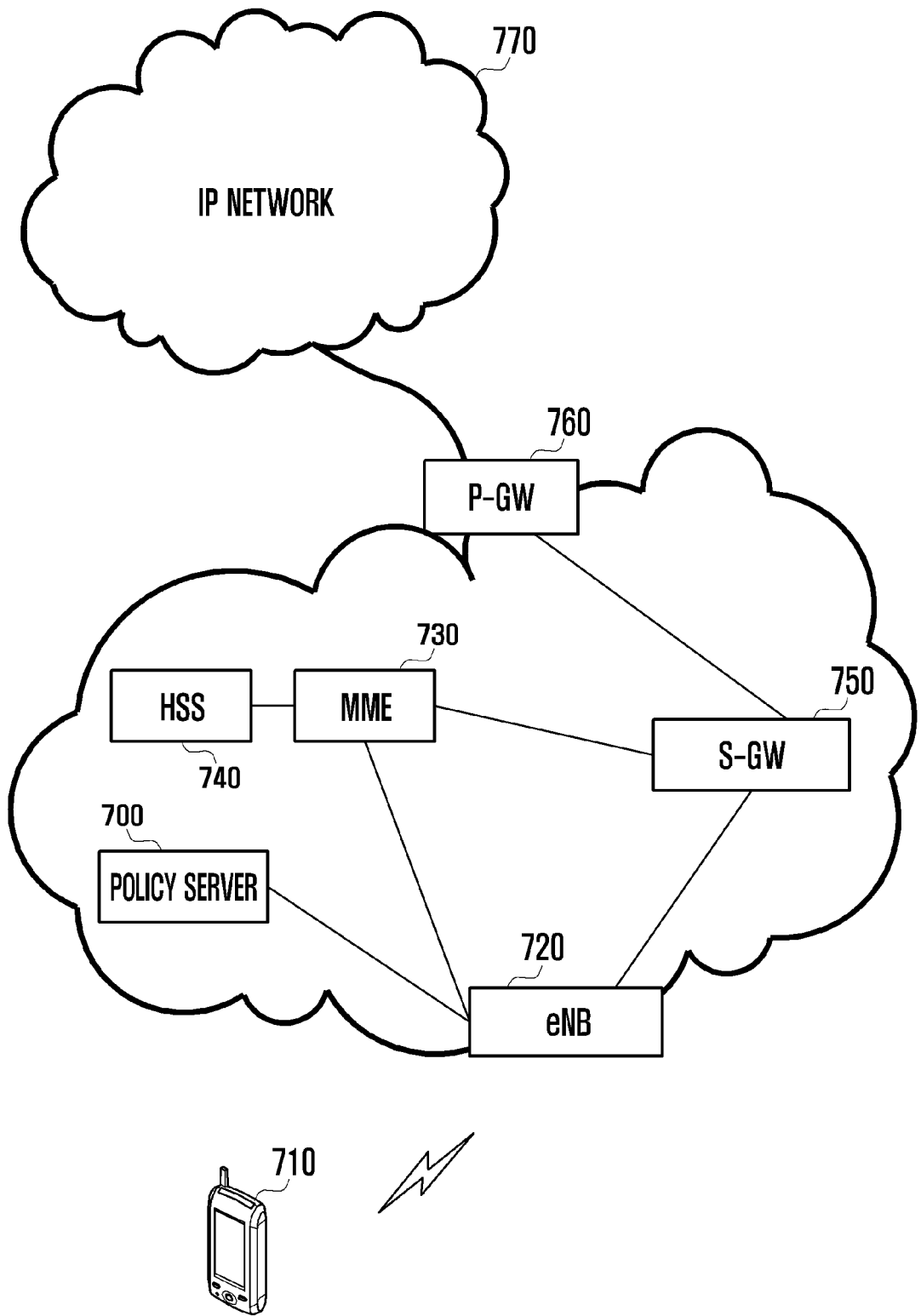
FIG. 8 is a diagram illustrating the architecture of a wireless communication system according to the second embodiment of the present invention.

FIG. 8 is a diagram illustrating the architecture of a wireless communication system according to the second embodiment of the present invention.

Referring to FIG. 8, the wireless communication system of this embodiment includes a policy server 700, a UE 710, an eNB 720, an MME 730, an HSS, an S-GW 750, and a P-GW 760. In the wireless communication of this embodiment, since the configurations and functions of the UE 710, the eNB 720, the MME 730, the HSS 740, the S-GW 750, and the P-GW 760 are similar to those described in the previous embodiment, detailed description thereof are omitted herein.

The policy server 700 determines the MTC policy per MTC UE for use in association with the UE 710. At this time, the policy server 700 sends the MTC policy to the MTC UE via the eNB 720 in order for the MTC UE to configure the MTC policy. Here, the MTC policy includes the essential MTC features for the MTC UE, selected MTC features, and information on whether it is possible to maintain the attachment to the radio network supporting no essential MTC features of the MTC UE. The policy server 700 can be an Open Mobile Alliance-Device Management (OMA-DM) server.

Figure 9:
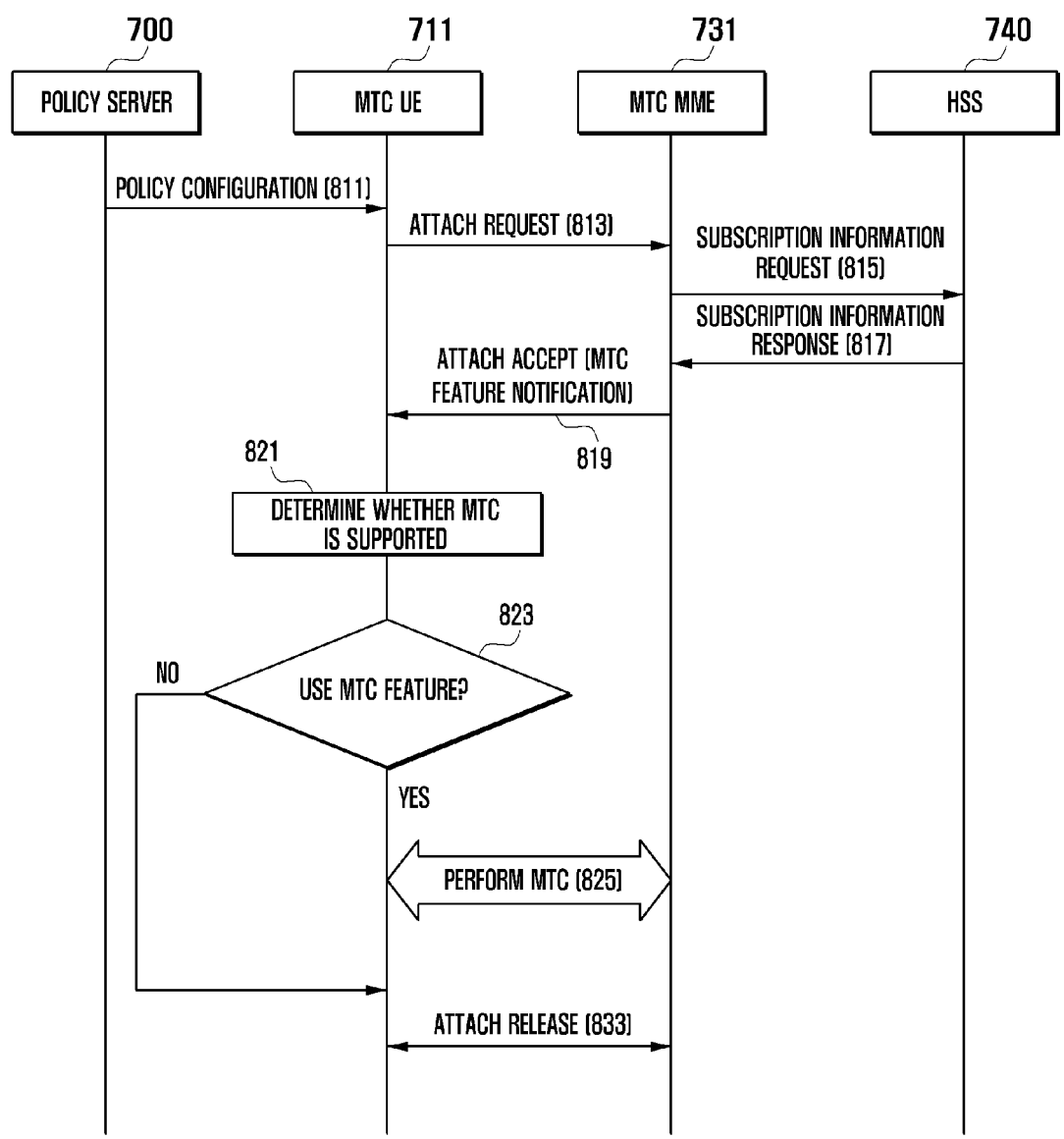
FIG. 9 is a signal flow diagram illustrating the connection procedure in the wireless communication system according to the second embodiment of the present invention.

FIG. 9 is a signal flow diagram illustrating the connection procedure in the wireless communication system according to the second embodiment of the present invention. Although the MTC UE is communicating with the server or the MTC MME via an eNB, this is omitted herein.

Referring to FIG. 9, in the connection procedure of the wireless communication system of this embodiment, the policy server 700 first configures the MTC policy for the MTC UE 711 at step 811. At this time, the MTC policy includes the essential MTC features, the selected MTC features, and information on whether the MTC UE 711 may maintain the attachment to the radio network which does not support the essential MTC features. Afterward, the MTC UE 711 requests the MME 730 for attachment at step 813. That is, the MTC UE 711 selects one of the radio networks accessible via the eNB 720 and request the MME 730 of the corresponding radio network for attachment. Here, the MTC UE 711 is capable of retaining the operator informations of the radio networks accessible via the eNB 720. At this time, the MTC UE 711 is capable of requesting the MTC MME 731 or a normal MME (not shown) for attachment. The MTC UE 711 is also capable of transmitting unique subscription identity information to the MME 730.

If the MTC UE 711 requests for attachment, the MTC MME 731 requests the HSS 740 for the subscription information of the MTC UE 711 at step 815. At this time, the MTC MME 7312 reports the location of the MTC UE 711 to the HSS 740 to request for the subscription information of the MTC UE 711. Here, the MTC MME 731 delivers the subscription identity information of the MTC UE 711 to the HSS 740. Afterward, if the subscription information of the MTC UE 711 is requested, the HSS 740 responds by sending the subscription information of the MTC UE 711 to the MTC MME 731 at step 817. At this time, the HSS 740 updates the location of the MTC UE 711 and notifies the MTC MME 731 of the update with the subscription information of the MTC UE 711. That is, the HSS 740 retrieves the subscription information of the MTC UE 711 in match with the subscription identity information and sends the found subscription information to the MTC MME 731. At this time, the subscription information includes the MTC subscription information for the MTC UE 711. Here, the MTC subscription information includes the essential MTC features and the selected MTC feature of the corresponding MTC UE 711.

If the subscription information of the MTC UE 711 is received, the MTC MME 731 accepts the attachment of the MTC UE 711 at step 819. At this time, the MTC MME 731 is retaining the MTC features supportable in the corresponding radio network. When accepting the attachment of the MTC UE 711, the MTC MME 731 notifies the MTC UE 111 of the supported MTC features. Here, the MTC MME 731 expresses the supported MTC features in a bitmap for notifying of the MTC features and transmits the bitmap to the MTC UE 711.

If the MME 730 accepts the attachment, the MTC UE 711 determines at step 821 whether the MME 730 supports MTC. That is, the MTC UE 711 determines whether the MME 730 is the MTC MME 731. At this time, the MTC UE 711 is capable of determining whether the MME 730 is the MTC MME 731 according to whether the MTC features have been transmitted by the MME 730. If it is determined that the MTC features have been transmitted by the MME 730, the MTC UE 711 determines that the MME 730 is the MTC MME 731. Otherwise, if it is determined that no MTC feature has been transmitted by the MME 730, the MTC UE 711 determines that the MME 730 is a normal MME.

The MTC UE 711 determines whether to use the supported MTC features of the MTC MME 731 at step 823. At this time, the MTC UE 711 determines whether to use the supported MTC features according to the MTC policy. That is, the MTC UE 711 determines based on the MTC policy whether the supported features include the essential feature. Here, if the supported MTC features include the essential MTC feature, the MTC UE 711 determines to use the supported MTC features. If the supported MTC features do not include the essential MTC feature, the MTC UE 711 determines whether to maintain the attachment to the MTC MME 731. Here, if it is determined to maintain the attachment, the MTC UE 711 determines to use the supported MTC features. Otherwise, if it is determined not to maintain the attachment, the MTC UE 711 determines not to use the supported MTC features.

If it is determined to use the supported features at step 823, the MTC UE performs MTC via the MTC MME 731 at step 825. At this time, if the supported MTC features include the essential MTC feature, the MTC UE 711 is capable of performing the MTC using the essential MTC features. Here, the MTC UE 711 is capable of performing MTC using the MTC feature selected among the supported MTC features of the MTC MME 731 as well as the essential MTC feature. If the supported MTC features do not include the essential MTC feature, the MTC UE 711 is capable of performing MTC using the supported MTC features of the MTC MME 731. Here, the MTC UE 711 is capable of performing MTC with the MTC feature selected among the supported MTC features of the MTC MME 731.

Otherwise, if it is determined not to use the supported MTC features at step 823, the MTC UE 711 releases the attachment to the MTC MME 731 at step 833.

Although the description is directed to an exemplary case where the MTC UE 711 determines whether the MTC features have been transmitted by the MME 730 to determine whether the MME 730 is the MTC MME 731 in this embodiment, the present invention is not limited thereto. That is, the present invention can be implemented in such a way that the supported MTC features are transmitted by the normal MME 733 as well as the MTC MME 731 and thus the MTC UE 711 differentiates between the MMEs. That is, the MTC MME 731 is retaining the supported MTC features while the normal MME 733 is not retaining any supported MTC feature. If the MTC UE 711 requests for attachment, the MTC MME 731 expresses the supported MTC features in a bitmap for notifying of the MTC features and transmits the bitmap to the MTC UE 711. Meanwhile, if the MTC UE 711 request for attachment, the normal MME 733 expresses the supported MTC features in a bitmap for notifying of the MTC features and transmits the bitmap to the MTC UE 711. Here, the bitmap is configured to indicate that the normal MME 733 has no supported MTC feature.

In this way, the MTC UE 711 is capable of checking whether the MME 730 supports MTC. The MTC UE 711 is also capable of checking whether the MME 730 supports the essential MTC feature or the selected MTC feature. That is, the MTC UE 711 is capable of discriminating between the MTC features supported and not supported by the MME 730.

Figure 10:
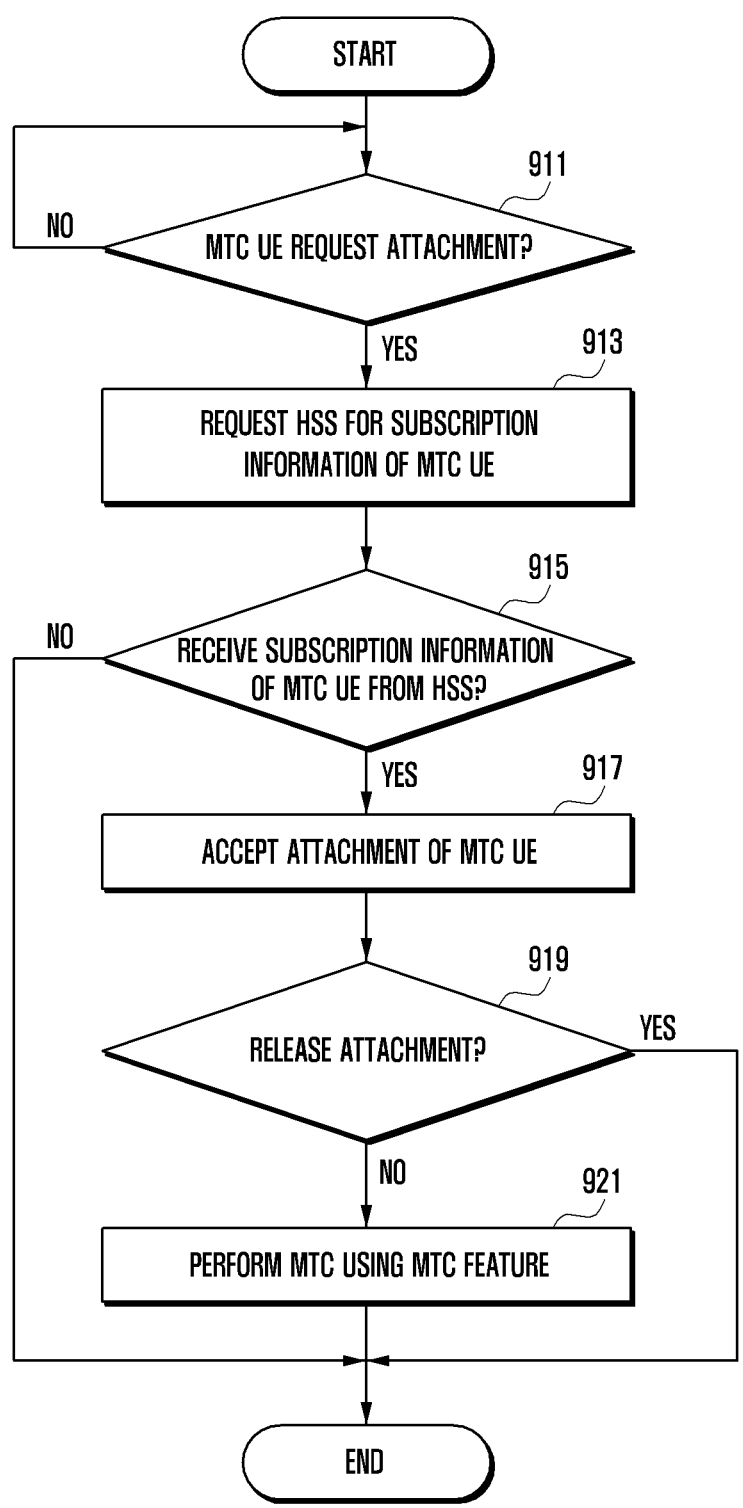
FIG. 10 is a flowchart illustrating the operating procedure of the MME in FIG. 9.

FIG. 10 is a flowchart illustrating the operating procedure of the MME in FIG. 9. In this embodiment, the description is made under the assumption that the MME is the MTC MME. In the case that the MME is a normal MME, the operating procedure of the normal MME is similar to that of the previous embodiment, the detailed description thereon is omitted herein.

Referring to FIG. 10, in the operations procedure of the MME 730 according to this embodiment, the MTC MME 731 first detects the attach request of the MTC UE 711 at step 911. At this time, the MTC MME 731 checks the subscription identity information of the MTC UE 711. Next, the MTC MME 731 requests the HSS 740 for the subscription information of the MTC UE 711 at step 913. At this time, the MTC MME 731 reports the location of the MTC UE 711 to the HSS 740 to request for the subscription information of the MTC UE 711. Here, the MTC MME 731 transmits the subscription information of the MTC UE 711 to the HSS 740.

Subsequently, if the subscription information of the MTC UE 711 is received from the HSS 740, the MTC MME 731 detects this at step 915 and accepts the attachment of the MTC UE 711 at step 917. At this time, the MTC MME 731 notifies the MTC UE 711 of the supported MTC features. Here, the MTC MME 131 expresses the supported MTC features in a bitmap for notifying of the MTC features and transmits the bitmap to the MTC UE 711. Afterward, the MTC MME 731 determines whether the attachment of the MTC UE 711 has been released at step 919. At this time, if the MTC UE requests for detachment, the MTC MME 731 detects this and accepts the release of the detachment.

Finally, if no request for detachment is detected at step 919, the MTC MME 731 performs MTC with the MTC UE 711 at step 921. At this time, if the supported MTC features include the essential MTC feature, the MTC MME 731 is capable of performing MTC using the essential MTC feature of the MTC UE 711. In order to optimize MTC, the MTC MME 731 is capable of checking the selected MTC feature for the MTC UE 711 among the supported MTC features. The MTC MME 731 is capable of performing MTC with the supported MTC features for the MTC UE 711. Here, in order to optimize MTC, the MTC MME 731 is capable of checking the selected MTC feature for the MTC UE 711 among the supported MTC features.

Figure 11:
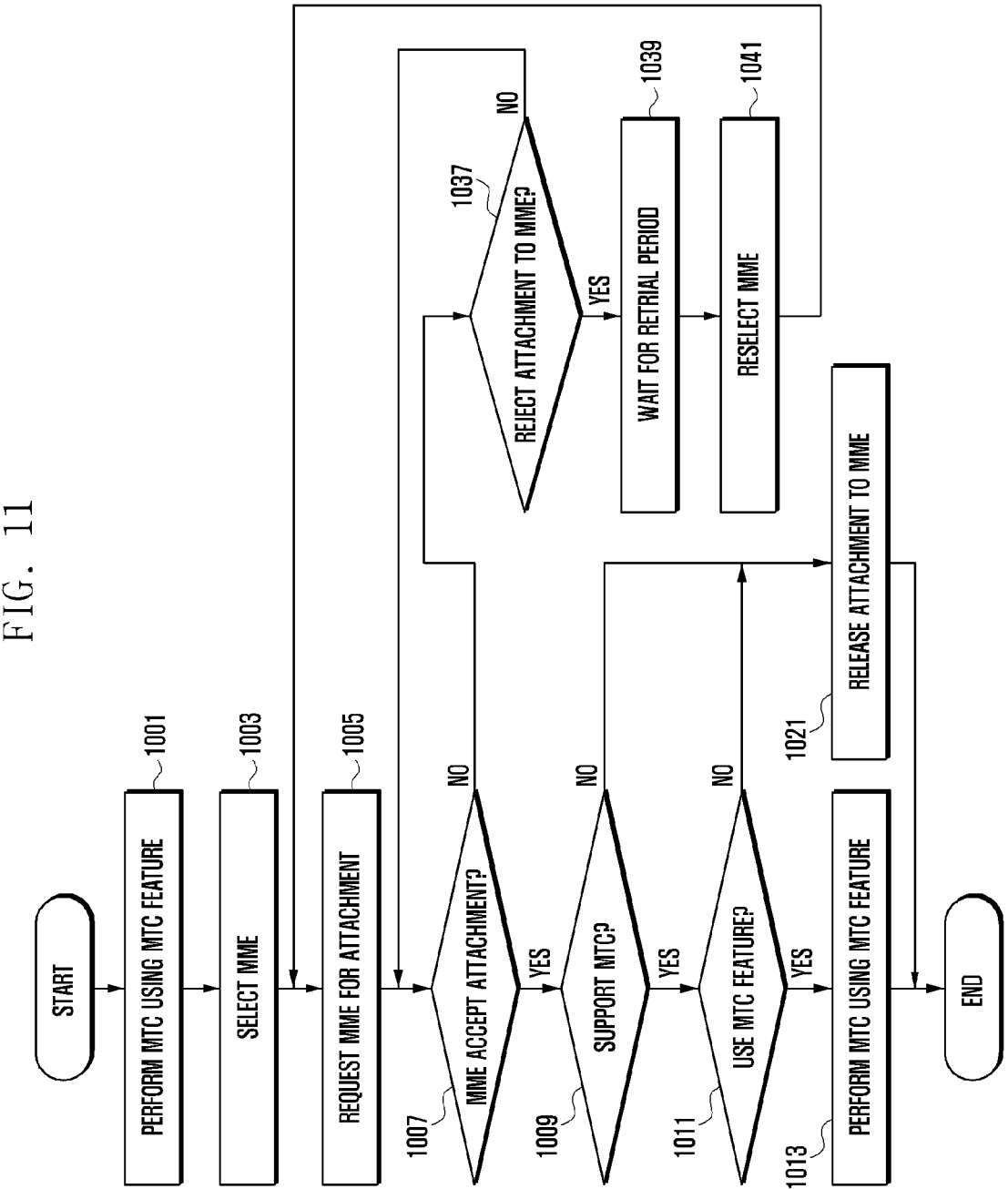
FIG. 11 is a flowchart illustrating the operating procedure of the UE in FIG. 9.

FIG. 11 is a flowchart illustrating the operating procedure of the UE in FIG. 9. In this embodiment, the description is made under the assumption that the UE is the MTC UE.

Referring to FIG. 11, in the operating procedure of the UE 110 according to this embodiment, the MTC UE 711 first configures an MTC policy according to the command of the policy server 700 at step 1001. Here, the MTC policy includes the essential MTC features of the MTC UE 711, selected MTC feature, and information on whether it is possible to maintain the attachment to the radio network which does not support the essential MTC feature. Afterward, the MTC UE 711 selects the MME 130 at step 1003. That is, the MTC UE 711 selects one of the radio networks accessible via the eNB 720 to access the MME 730. At this time, the MTC UE 711 is retaining the operator's informations of the radio networks accessible via the eNB 720. Next, the MTC UE 711 requests the MME 730 for attachment at step 1005. At this time, the MTC UE 711 is capable of requesting the MTC MME 731 or the normal MME for attachment. The MTC UE 711 is also capable of transmitting the unique subscription identity information to the MME 730.

Subsequently, if the MME 730 accepts the attachment, the MTC UE 711 detects this at step 1007 and determines whether the MME 730 supports MTC at step 1009. At this time, the MTC UE 711 is capable of determining whether the MME 730 is the MTC MME 731 by checking whether the MME 730 has transmitted the MTC features. If the MTC features have been transmitted, the MTC UE 711 determines that the MME 730 is the MTC MME 731. Otherwise, no MTC feature has been transmitted, the MTC UE 711 determines that the MME 730 is a normal MME. The MTC UE 711 receives the bitmap indicating the MTC features from the MME 730 and checks the supported MTC features of the MME 730. The MTC UE 711 is capable of determining whether the MME 730 supports MTC for the MTC UE 711 according to the supported features of the MME 730.

Subsequently, if it is determined that the MME 730 supports MTC at step 1009, the MTC UE 711 determines whether to use the supported MTC features of the MTC MME 731 at step 1011. At this time, the MTC UE 711 is capable of determining whether to use the supported MTC features according to the MTC policy. Here, if the supported MTC features include the essential MTC feature, the MTC UE 711 determines to use the supported MTC features. If the supported MTC features do not include the essential MTC feature, the MTC UE 711 determines whether to maintain the attachment to the MTC MME 731 according to the MTC policy. Here, if it is determined to maintain the attachment, the MTC UE 711 determines to use the supported MTC features. If it is determined not to maintain the attachment, the MTC UE 711 determines not to use the supported MTC features.

Finally, if it is determined to use the supported MTC features at step 1011, the MTC UE 711 performs MTC through the MME 730, i.e. MTC MME 731, at step 1013. At this time, if the supported MTC features include the essential MTC feature, the MTC UE 711 is capable of performing MTC using the essential MTC features. The MTC UE 711 is also capable of performing MTC using the MTC feature selected among the supported MTC features of the MTC MME 731 in addition to the essential MTC features. If the supported MTC features do not include any essential feature, the MTC UE 711 is capable of performing MTC using the supported MTC features of the MTC MME 731. Here, the MTC UE 711 is capable of checking the MTC feature selected among the supported MTC features of the MTC MME 731 and using the selected MTC feature.

If it is determined not to support MTC at step 1009 or if it is determined not to use the supported MTC features, the MTC UE 711 releases the attachment to the MME 730 at step 1021. At this time, the MTC UE 711 is capable of retaining the operator information of the radio network corresponding to the MME 730 to reference for selecting MME 730 afterward. That is, the MTC UE 711 is capable of storing the corresponding radio network operator information as selection forbidden information so as not to request for attachment to the corresponding MME 730.

If the MME 730 does not accept the attachment at step 1007 and if the MME 730 rejects the attachment, the MTC UE 711 detects this at step 1037 and waits for the attachment retrial period at step 1039. At this time, the MTC UE 711 is capable of waiting for a predetermined attachment retrial period. The MTC UE 711 is also capable of waiting for the attachment retrial period notified by the MME 730. Afterward, the MTC UE 711 reselects the MME at step 1041 and returns the procedure to step 1005. Next, the MTC UE 711 performs at least a part of steps 1005 to 1041 again.

At this time, the MTC UE 711 is capable of storing the operator informations of the radio networks accessible via the eNB 720 and using the operator informations for selecting another MME 730. The MTC UE 711 is also capable of using the other radio networks operators informations notified by the MTC MME 731 to select another MME 730. For example, if the operator informations of the respective radio networks are stored previously, the MTC UE 711 is capable of selecting another MME 730 using these informations and, otherwise, selecting another MME 730 as notified by the MTC MME 731. Here, the MTC UE 711 is capable of selecting another MME 730 by referencing the previously stored selection forbidden information. That is, the MTC UE is capable of ruling out the selection forbidden information in the operator informations of the respective radio networks that are stored previously or notified by the MTC MME 731 selecting another MME 730 in selecting another MME 730.

According to this embodiment, it is possible to connect the UE 710 to an MME 730 supporting the corresponding supplementary function efficiently in the wireless communication system. That is, the present invention is capable of connecting the MTC UE 711 to the MTC MME 731 supporting the corresponding essential MTC feature efficiently. As a consequence, the MTC MME 731 is capable of supporting MTC more efficiently and the MTC UE 711 is capable of performing MTC more efficiently in the wireless communication system.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

What is claimed is:

1. A method for communication at a mobility management entity (MME) in a communication system, the method comprising:
   receiving an attach request message from a terminal;
   transmitting a subscription information request message for the terminal to a home subscriber server (HSS);
   receiving a subscription information response message comprising a subscription information of the terminal and tracking area update (TAU) timer information for the terminal from the HSS; and
   transmitting an attach response message based on the subscription information of the terminal to the terminal, the attach response message comprising the TAU timer information for the terminal.

2. The method of claim 1, further comprising:
   receiving a TAU message from the terminal based on the TAU timer information.

3. The method of claim 1, wherein the receiving an attach request message comprising:
   receiving operator policy information from the terminal, and
   wherein transmitting an attach response message comprising
   transmitting the attach response message based on the subscription information of the terminal and operator policy information.

4. The method of claim 1, further comprising:
   determining whether the MME supports the terminal operation based on the subscription information of the terminal; and transmitting, if the MME does not support the terminal operation, a reject message to the terminal.

5. The method for communication at a terminal in a communication system, the method comprising:
- transmitting an attach request message to a mobility management entity (MME), the MME configured to transmit a subscription information request message for the terminal to a home subscriber server (HSS) and to receive a subscription information response message comprising a subscription information of the terminal and tracking area update (TAU) timer information for the terminal from the HSS; and
- receiving an attach response message based on the subscription information of the terminal from the MME, the attach response message comprising the TAU timer information for the terminal.

6. The method of claim 5, further comprising:
- transmitting a TAU message to the MME based on the TAU timer information.

7. The method of claim 5, wherein the transmitting attach request message comprising:
- receiving operator policy information from an operator server; and
- transmitting the received operator policy information to the MME,
- wherein receiving an attach response message comprising
- receiving the attach response message based on the subscription information of the terminal and operator policy information.

8. The method of claim 5, further comprising:
- receiving, if the MME does not support the terminal operation, a reject message to the terminal, the MME configured to determine whether the MME supports the terminal operation based on the subscription information of the terminal.

9. A mobility management entity (MME) in a communication system, comprising:
- a transceiver configured to transmit and receive signal to and from a terminal; and
- a controller configured to receive an attach request message from a terminal, to transmit a subscription information request message for the terminal to a home subscriber server (HSS), to receive a subscription information response message comprising a subscription information of the terminal and tracking area update (TAU) timer information for the terminal from the HSS and to transmit an attach response message based on the subscription information of the terminal to the terminal, the attach response message comprising the TAU timer information for the terminal.

10. The MME of claim 9, wherein the controller further configured to receive a TAU message from the terminal based on the TAU timer information.

11. The MME of claim 9, wherein the controller further configured to receiving operator policy information from the terminal and to transmit the attach response message based on the subscription information of the terminal and operator policy information.

12. The MME of claim 9, wherein the controller further configured to determine whether the MME supports the terminal operation based on the subscription information of the terminal and to transmit, if the MME does not support the terminal operation, a reject message to the terminal.

13. A terminal in a communication system, comprising:
- a transceiver configured to transmit and receive signal to and from a mobility management entity (MME), MME configured to transmit a subscription information request message for the terminal to a home subscriber server (HSS) and to receive a subscription information response message comprising a subscription information of the terminal and tracking area update (TAU) timer information for the terminal from the HSS; and
- a controller configured to transmit an attach request message to a MME and to receive an attach response message based on the subscription information of the terminal from the MME, the attach response message comprising the TAU timer information for the terminal.

14. The terminal of claim 13, wherein the controller further configured to transmit a TAU message to the MME based on the TAU timer information.

15. The terminal of claim 13, wherein the controller further configured to receive operator policy information from an operator server, to transmit the received operator policy information to the MME and to receive the attach response message based on the subscription information of the terminal and operator policy information.

16. The terminal of claim 12, wherein the controller further configured to receiving if the MME does not support the terminal operation, a reject message to the terminal, the MME configured to determine whether the MME supports the terminal operation based on the subscription information of the terminal.

\* \* \* \* \*